United States Patent [19]

Greene

[11] Patent Number: 4,799,737

[45] Date of Patent: Jan. 24, 1989

[54] SHOULDER BELT ADJUSTER

[76] Inventor: Marc B. Greene, 73 Market St., Venice, Calif. 90291

[21] Appl. No.: 26,105

[22] Filed: Mar. 16, 1987

[51] Int. Cl.⁴ .......................... B60R 22/10; B60R 22/24
[52] U.S. Cl. ..................................... 297/468; 280/808; 297/483
[58] Field of Search .............. 297/468, 483, 473, 486; 280/801, 802, 808

[56] References Cited

U.S. PATENT DOCUMENTS

| | | | |
|---|---|---|---|
| 4,236,755 | 12/1980 | Pollitt et al. | 297/468 X |
| 4,243,266 | 1/1981 | Anderson | 297/468 X |
| 4,289,352 | 9/1981 | Ashworth | 297/468 X |
| 4,319,769 | 3/1982 | Compeau et al. | 280/808 |
| 4,609,205 | 9/1986 | McKeever | 280/808 |

FOREIGN PATENT DOCUMENTS 7601335  8/1977  Netherlands ...................... 280/808

Primary Examiner—Peter R. Brown
Attorney, Agent, or Firm—Thomas P. Mahoney

[57] ABSTRACT

An auxiliary adjusting device for the shoulder belt of a vehicular seat restraint system having a first, upper attachment point and a second, lower attachment point which includes engagement means engageable with said shoulder belt between said upper and lower attachment points to provide an intermediate attachment point which will permit the shoulder belt to be adjusted to conform to the height of individuals occupying the vehicular seat. The engagement means is adjustably secured in operative relationship with the vehicle by adjustment means which permit the engagement means to be shifted upwardly and downwardly to vary the height of the shoulder belt.

3 Claims, 1 Drawing Sheet

SHOULDER BELT ADJUSTER

BACKGROUND OF THE INVENTION

This invention relates to vehicular seat restraint systems and, more particularly, to a shoulder belt adjuster which will permit the shoulder belt of a conventional vehicular restraint system to be adjusted in accordance with the height requirements of an individual seated in the respective seat.

Commonly installed vehicular seat restraint systems now conventionally incorporate a shoulder belt which extends diagonally across the shoulder and upper torso of the person seated in the seat and a lap belt which extends across the lap of the seat-occupying individual. Conventionally, the shoulder belt extends angularly between an outboard upper point of attachment on the vehicle and a lower inboard point of attachment usually constituted by the restraint portion of the seat buckle to which the lap belt is also attached. Frequently, a common inertially operable reel is attached to corresponding extremities of the shoulder and lap belts.

One of the major disadvantages of conventional systems is that no means is provided for accommodating the shoulder belt to individuals of different heights who are restrained by the restraint system. Consequently, particularly in the case of children and short adults, the shoulder belt, instead of being a safety device, becomes a source of continual discomfort and, in the case of collision, a frequent cause of disabling injuries.

Of course, a variety of prior art expedients have been provided in an attempt to accommodate this anomalous situation, among them being elaborate restraint systems which include means for lowering the upper point of attachment of the entire shoulder strap system, thus entailing the necessity for providing adjustable attachment means at the upper end of the shoulder belt which does not accomplish the desired adjustment of the shoulder belt with reference to the individual restrained thereby.

In addition, there is not available in the prior art an adjuster which can be installed in a vehicle to accommodate existing conventional shoulder belt systems to eliminate the inadequacies of such systems mentioned hereinabove.

OBJECTS AND ADVANTAGES OF THE INVENTION

A primary object of the invention is the provision of an auxiliary shoulder belt adjuster which is adapted to engage the shoulder belt of a vehicle seat restraint system and to permit the shoulder belt to be adjusted intermediate its upper and lower points of attachment and, thus, to accommodate individuals of different heights without altering the upper and lower points of attachment to the vehicle.

Another object of the seat belt adjuster of my invention is the provision of a device which can be readily installed in a vehicle to permit the adjustment of a previously installed conventional seat belt.

A further object of my invention is the provision of a shoulder belt adjuster which is adapted to adjust the height of the shoulder belt of a conventional seat belt restraint system and which includes engagement means adapted to engage the shoulder belt intermediate its upper and lower points of attachment to provide an adjustable third point of attachment of the shoulder belt to the vehicle.

Another object of my invention is the provision of an adjuster which can be readily engaged or disengaged with or from said shoulder belt to permit it to be rendered inoperative when the need for its utilization is not indicated.

A further object of my invention is the provision of a shoulder belt adjuster wherein the aforesaid engagement means includes a yoke which is engageable with the shoulder belt intermediate its upper and lower points of attachment, said yoke having means for facilitating the facile engagement or disengagement of said intermediate portion of said shoulder belt therewith.

An associated object of my invention is the provision of a shoulder belt adjuster of the aforementioned character wherein the engagement means is positively secured to the vehicle by securement means incorporating adjustment means which permits the aforesaid yoke of the engagement means to be readily adjusted vertically to raise or lower the intermediate point of attachment of said shoulder belt to said vehicle.

BRIEF DESCRIPTION OF THE DRAWINGS

Other objects and advantages of the invention will be apparent from the following specification and the accompanying drawings in which.

DESCRIPTION OF PREFERRED EMBODIMENTS OF THE INVENTION

Figure 1:
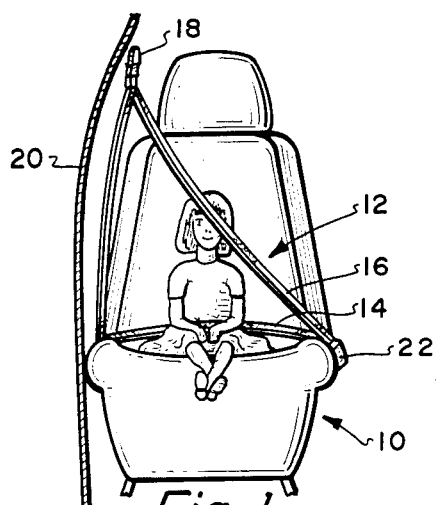
FIG. 1 is an illustrative view showing the manner in which a conventionally secured shoulder belt of a conventional restraint system does not properly accommodate the needs of a child or small adult seated in the relevant seat.
Figure 2:
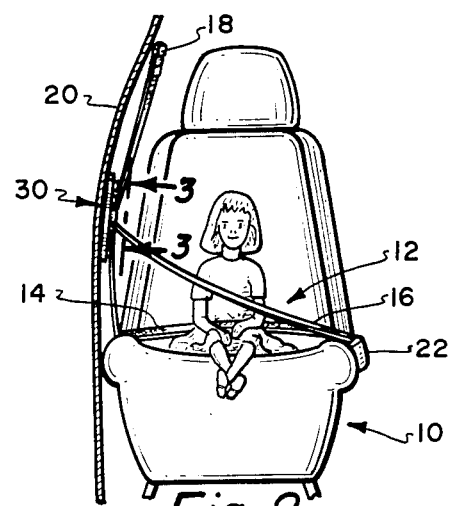
FIG. 2 is a view similar to FIG. 1 showing how the utilization of the adjuster of the present invention permits the shoulder belt to be engaged by the adjuster intermediate its extremities to lower the point at which the shoulder belt engages a child or a short individual seated in the seat.

Referring to the drawings, and particularly to FIGS. 1–2 thereof, there is shown a vehicular seat 10 having a conventional seat belt restraint system 12 operatively associated therewith. The restraint system 12 includes a lap belt 14 and a shoulder belt 16, the shoulder belt 16 having an upper connection point 18 to the wall 20 of the vehicle in which the seat 10 is located and a lower point of attachment constituted by the buckle 22 of the restraint system.

An intertial reel, not shown, is frequently associated with the seat belt system 12, in order that the lap belt 14 and shoulder belt 16 constituting elements of the same may effectively restrain an individual seated in the seat 10 when a collision or other accident occurs.

Therefore, it can be readily perceived that the conventional restraint system 12 includes an upper, outer point of attachment 18 to the wall 20 of the vehicle and a lower, inner point of attachment 22 constituted by the conventional buckle of the restraint system 12.

Unfortunately, as depicted in FIG. 1 of the drawings, the conventional attachment of the shoulder belt 16 between the upper, outer point of attachment 18 and the lower, inner point of attachment 22 does not effectively accommodate shorter individuals who are utilizing the seat associated with the system. With short adults or children, the shoulder belt 16 is actually so located between the upper and lower points of attachment 18 and 22 that it frequently engages portions of the anatomy, such as the head or neck, which are not intended to be restrained and poses a possibility of serious injury to the individual restrained by the restraint system 12.

In order to eliminate this undesirable location of the shoulder belt 16, I provide a shoulder belt adjuster 30 which is mounted, as best shown in FIG. 2 of the drawings, on the wall 20 of the vehicle and which constitutes a third point of attachment of the shoulder belt intermediate its extremities.

Figure 3:
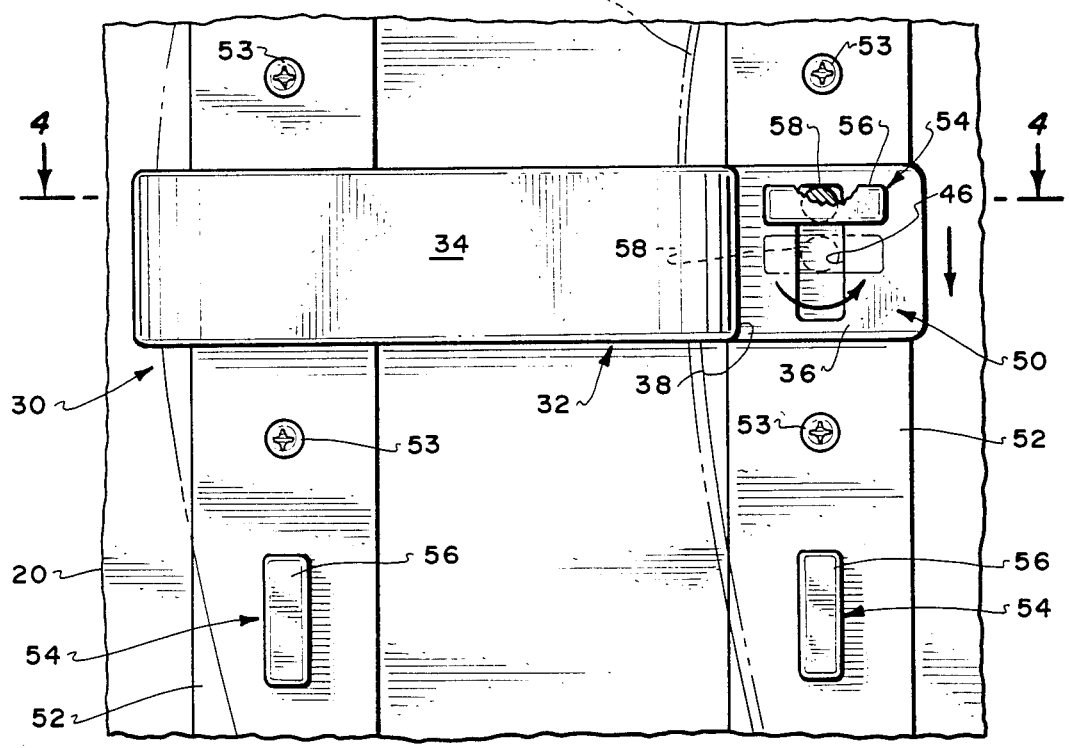
FIG. 3 is a front elevational view taken from the line 3—3 of FIG. 2 showing a portion of the securement means of the shoulder belt adjuster and indicating the manner in which the yoke constituting the engagement means may be readily from one position to another on the securement means.
Figure 4:
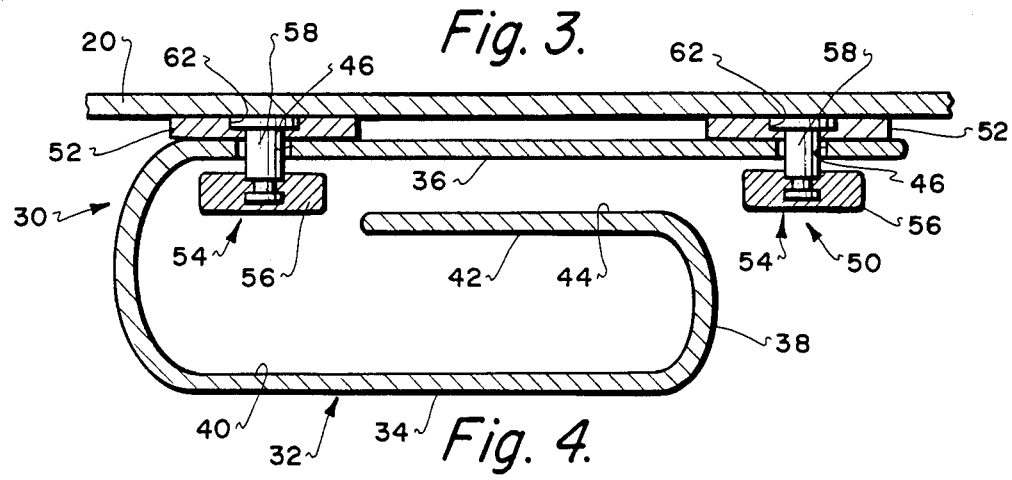
FIG. 4 is a transverse sectional view taken on the line 4—4 of FIG. 3 showing the engagement means and the manner of securing the same in a selected position on the securement means of the adjuster.

The shoulder belt adjuster 30, as shown in greater detail in FIGS. 3 and 4 of the drawings, includes shoulder belt engagement means 32, which is constituted by a yoke 34 having a base plate 36 and a reatiner sleeve 38. The retainer sleeve 38 defines a receptor 40 for the intermediate portion of the shoulder belt 16 and includes a straight leg 42 parallel to the face of the base plate 36 which defines an entry passage 44 for easily inserting or removing the intermediate portion of the shoulder belt 16 into or from the receptor 40.

A pair of spaced slots 46 is provided in the base plate 36 of the engagement means 32, said slots being adapted to be engaged by securement means generally indicated at 50 in FIGS. 3 and 4 of the drawings, said securement means including a pair of elongated tracks 52 which are mounted on the wall 20 of the vehicle by means of screws 53 or similar fasteners. Although the securement means 50 is disclosed as incorporating a pair of tracks 52, it will be obvious to those skilled in the art that the pair of tracks 52 may be provided in a unitary structure functioning in the identical manner of the pair of tracks. For instance, a single track may be provided in substitution for the pair of tracks to facilitate affixation of the track portion of the securement means to the wall 20 of the vehicle.

Customarily, the tracks 52 are fabricated from steel sheet material and may be painted or otherwise finished to harmonize with the interior of the vehicle. Incorporated in the tracks 52 are vertically spaced pairs of locating and adjustment means constituted by turnkevs 54, said turnkeys including finger grips 56 which are mounted on the outer extremities of shafts 58, said shafts having their inner extremities mounted in corresponding counterbores 62 in the tracks 52.

Although I have disclosed the utilization of vertically spaced pairs of turnkeys 54 as a component of the securement means 50, it will be obvious to those skilled in the art that there is a wide variety of equivalent expedients which can be utilized in substitution therefor.

Consequently, when a child or short adult is seated in the vehicular seat 10, adjustment of the shoulder belt 16 by reducing the angular orientation thereof to accommodate the shorter individual or child is indicated. To accomplish this desired end, the shoulder belt 16 is engaged in the engagement means 32 by the simple expedient of passing the intermediate portion of the shoulder belt through the entry passage 44 and locating it in the receptor 40 of the engagement means 32. This can be done while the engagement means 32 is located on the pair of tracks 52 in a previous orientation of the shoulder belt 16.

If desired, however, the engagement means 32 can be removed from operative relationship with the pair of tracks 52 by the simple rotation of the turnkeys 54 to permit them to pass through the elongated slots 46 in the bottom plate 36 of engagement means 32, thus facilitating removal of the engagement means 32.

With the engagement means 32 in hand, the location of the intermediate portion of the seat belt 16 in the previously described relationship can be readily accomplished. With the child seated in the position of FIGS. 1 and 2, an adult can then manipulate the engagement means 32 into a position wherein a suitable portion of the child's anatomy is engaged by the shoulder belt 16, as graphically depicted in FIG. 2 of the drawings. After the relative location of the engagement means 32 has been accomplished in this manner, the turnkeys 54 can be registered with the slots 46 in the bottom plate 36 of the engagement means 32 to permit the turnkeys 54 to pass through said slots and to be rotated into the position of FIG. 3 of the drawings, wherein the engagement means is secured against displacement from the pair of tracks 52.

Of course, an adult can make the adjustment for himself. If a larger adult is the subsequent person utilizing the vehicular seat 10, he can simply grasp the seat belt 16, whos intermediate portion is located in the receptor 40 of the engagement means 32, and readily thread it out of the receptor 40 through the entry passage 44 and, thus, permit the intermediate portion of the seat belt 16 to assume the original angle at which it was installed in the vehicle.

Then, when a child who is a regular occupant of the vehicle is placed in the seat 10, the intermediate portion of the shoulder belt 16 can be engaged with the engagement means 32 by the simple expedient of threading it through the entry passage 44 and locating it in the receptor 40 of said engagement means. Consequently, the repeated adjustment of the seat belt retainer system for normal use incident to prior art structures is eliminated and, conversely, the special adjustment required for a regular, smaller user such as a child or short adult is obviated.

Although I have shown specific examples of the manner and the materials in and from which the adjuster of the invention can be fabricated, it will be obvious to those skilled in the art that equivalent structures and materials can be utilized without departing from the spirit of the invention or the language of the claims which appear hereinbelow.

I claim:

1. In a shoulder belt adjuster for a vehicle seat restraint system consisting of a shoulder belt having an outboard, upper point of attachment and an inboard, lower point of attachment and a lap belt cooperative with said shoulder belt, the combination of: rigid track means secured to an interior wall of said vehicle and having a plurality of vertically spaced turnkeys mounted thereupon; and a yoke member engageable with said shoulder belt between said upper and lower attachment points, said yoke member having openings therein for receiving said turnkeys whereby said yoke member can be removed from operative engagement with said turnkeys and engaged with others thereof to vertically adjust said yoke member and, thus, the intermediate portion of said shoulder belt.

2. The adjuster of claim 1 in which said yoke member incorporates a receptor portion for releasably retaining said intermediate portion of said shoulder belt in operative engagement therewith.

3. The adjuster of claim 2 in which said track means includes a plurality of tracks and said turnkeys are arranged in spaced pairs thereupon.

* * * * *